Patented Sept. 11, 1928.

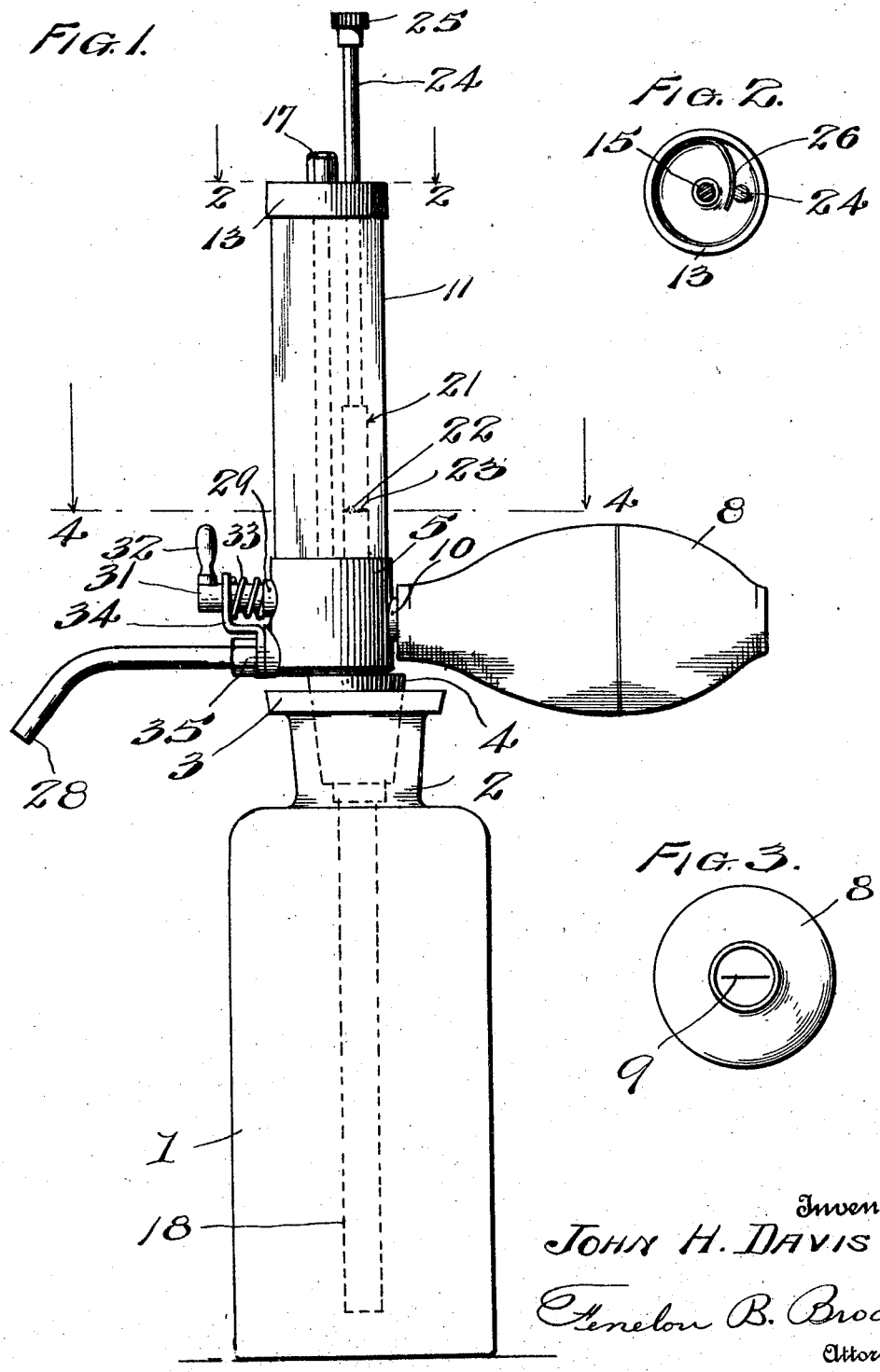

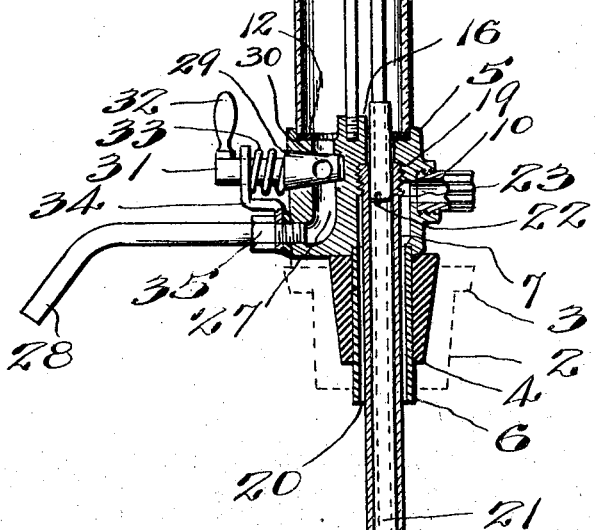

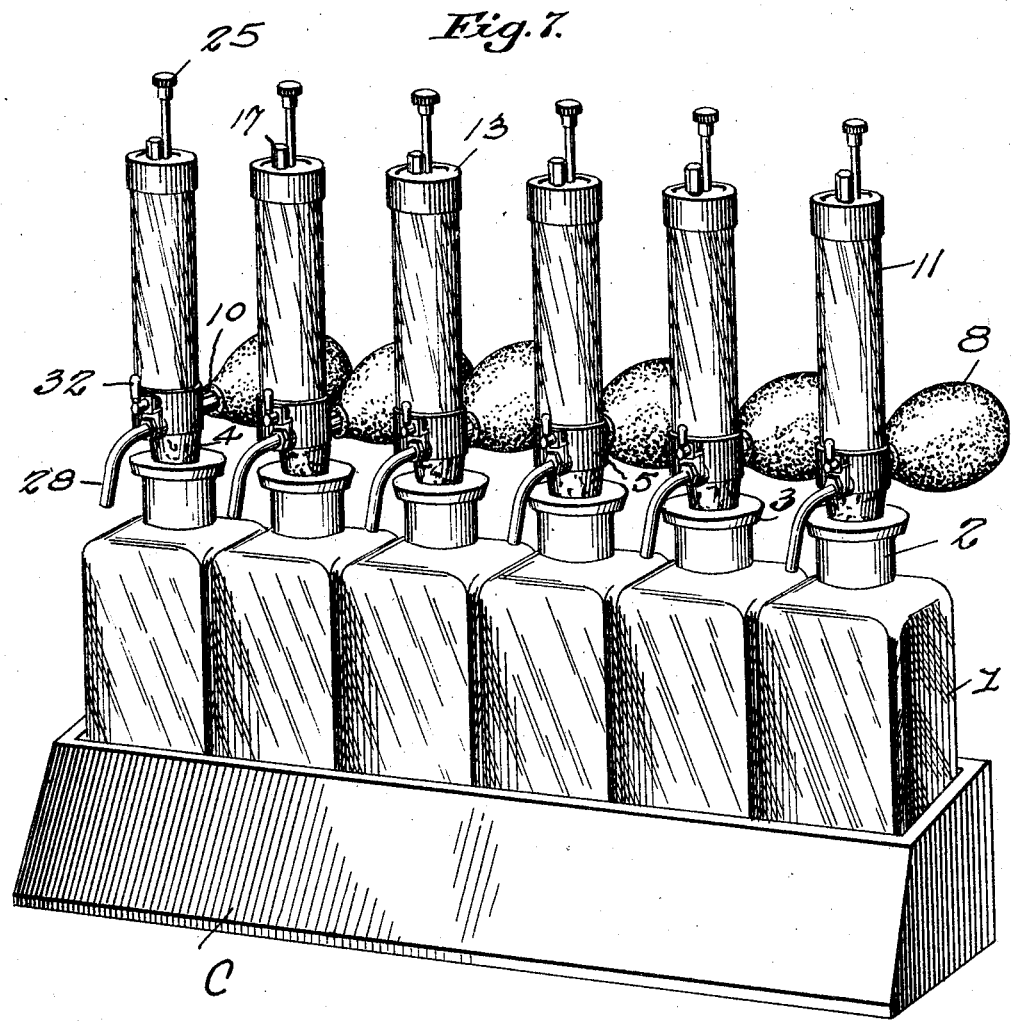

1,684,171

UNITED STATES PATENT OFFICE.

JOHN H. DAVIS, OF BOSTON, MASSACHUSETTS.

LIQUID-DISPENSING DEVICE.

Application filed March 25, 1927. Serial No. 178,241.

My present invention relates to an improved liquid dispensing device by means of which liquids may be measured and a predetermined bulk or small quantity of the liquid may be dispensed.

The dispensing device or apparatus is of the type employing a compressible elastic bulb supplying the necessary air pressure to lift or eject the liquid from its receptacle or reservoir, to a discharge chamber. Means are provided for measuring the predetermined bulk or quantity of liquid injected into the discharge chamber, and means are provided for withdrawing and discharging the measured quantity from the discharge chamber.

While the dispensing device of my invention is adapted for dispensing various liquids, it is especially designed for dispensing liquid perfumery, and the device is so constructed and arranged that it may be applied to a bottle of perfumery for dispensing the liquid therefrom. After the bottle has been emptied, the dispensing device may be removed therefrom and the supply replenished in the bottle, or the device may be applied for use with another full bottle of perfumery.

The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is a view in side elevation of the dispensing device of my invention shown in operative position with relation to a bottle of liquid. Figure 2 is a sectional detail view at line 2—2 of Fig. 1. Figure 3 is an end view of the bulb showing a vent slit or slot in the end of the bulb. Figure 4 is a horizontal sectional detail and plan view at line 4—4 of Fig. 1. Figure 5 is a vertical sectional detail view of the operating parts of the device with the bulb omitted for convenience of illustration, and with a portion of the bottle illustrated in dotted lines. Figure 6 is a detail view in elevation showing especially the graduations or measuring scale on the exterior of the glass cylinder forming the discharge chamber. Figure 7 is a perspective view showing a number of the devices arranged in a cabinet.

Preferably a number of bottles of perfume are supported for display and for convenience in a cabinet or base C.

In the preferred form of the invention as shown in the drawings, I have indicated one of the bottles as 1 having a neck 2 and the usual bead or head 3. While I shall hereinafter refer to the bottle as containing liquid perfumery, it will of course be understood that liquid may be drawn from other suitable receptacles or reservoirs. As here shown, the dispensing device is adapted for use in a store and it is manipulated by the sales person for delivering a purchased quantity of perfumery to a customer.

The liquid dispensing device is provided with a stopper 4 fashioned of rubber or other suitable material and tapered to fit into the neck of the perfumery bottle with an airtight seal. A pump head 5 is used and provided with an extension sleeve 6 projected from its bottom face, and the stopper as best shown in Figure 5 is slipped over this sleeve and pressed up against the under face of the head 5 to form a substantial support for the dispensing device.

Within the head 5, an air chamber 7 is formed, and a bulb 8 is provided for supplying air to this chamber. As seen in Fig. 3, the outer end of the bulb is provided with a slit or slot 9 to perform the functions of a vent opening under certain conditions. The bulb is connected to the head 5 by a nipple 10, and this nipple of course opens into the air chamber 7.

On top of the head 5, a glass cylinder 11 is supported to form the discharge or measuring chamber for the liquid perfumery. This cylinder is seated in a socket in the upper face of the head, and a gasket 12 is used to make an airtight joint with the head. At its upper end, the cylinder is closed by a metallic end cap 13, and a gasket 14 is also used at the upper end of the cylinder to provide an airtight joint. The cylinder is secured to the head by means of a tie bolt 15 which at its lower end is threaded into a boss 16 of the head. This tie bolt is passed through a central opening in the cap 13, and the exterior head 17 of the bolt clamps the cylinder and cap rigidly with the head 5.

A supply pipe 18, preferably of gutta percha or hard rubber, is threaded at 19 in the head 5. This pipe is passed upwardly through the sleeve 6 and into the air space or chamber 7, and is threaded into the head as indicated in Fig. 5, and when the dispensing device is applied to a bottle of perfumery, the lower open end of this pipe 18 terminates just above the bottom of the bottle as indicated in Fig. 1. The sleeve 6 and the supply pipe 18 are of such diameter as to provide an annular air space 20 which communicates with the air chamber 7. Thus it will be seen that when the supply pipe 18 is submerged in the liquid perfumery of the bottle, by compressing the bulb 8, air is forced through the chamber 7 and the air space 20 to the interior of the bottle, and by this air pressure the liquid is forced upwardly through the open lower end of the supply pipe 18 and up through the pipe.

With this supply pipe 18, I utilize a measuring tube 21 also of hard rubber or other suitable material. This measuring tube telescopes in the supply pipe, and is provided with a discharge orifice or port 22 near its upper end, and an exterior line or mark 23 is placed on the measuring tube on a level with the orifice or port 22. The upper end of the measuring tube is closed by a rod or stem 24, and this stem has a knob or pull handle 25. The stem extends down through an opening in the cap 13 which opening may vent the chamber 11 to the atmosphere, and the measuring tube passes through an opening in the head 5. By means of the knob, the stem and tube may be pulled upwardly to predetermine the quantity of liquid to be elevated from the interior of the bottle to the interior of the cylinder 11, and a spring 26 is coiled about the bolt 15 and clamped by its head 17 to frictionally engage the stem 24 in order to insure a stable movement of the stem. It will be understood that the measuring tube 21 which telescopes in the supply pipe 18 may be reciprocated in said pipe, and it may be elevated from normal position in Fig. 5 to a selected position as in Fig. 1 for measuring or predetermining the quantity of perfumery to be dispensed. The liquid in the chamber 11 is thus measured by first elevating an excess quantity of the liquid, by compression of the bulb 8, after which pressure is released from the bulb and the latter is vented to the atmosphere through slot 9 in the outer end of the bulb, thereby permitting the excess liquid in the chamber 11 above the orifice 22, to flow back to the bottle 1.

In connection with the port and line 23 on the measuring tube, I use a scale or graduations as indicated in Fig. 6. The lines and data of this scale may be shown in contrasting color, as red, and the mark 23 on the measuring tube may also be red in color.

It will be apparent that when the measuring tube is elevated, as for instance in Fig. 1, and the line 23 made to coincide with a line of the scale in Fig. 6, as for instance the line indicating one-eighth of an ounce, then by pressing on the bulb 8 the liquid perfumery will be lifted from the bottle through the pipe 18, the tube 21, and poured out into the discharge chamber 11. When the level of the liquid reaches the mark 23, or the one-eighth ounce mark in Fig. 6, pressure is relieved from the bulb, and the flow of liquid ceases. In pressing the bulb, the thumb is placed on top of the bulb and the forefinger on the bottom so that the slit 9 will be held closed, and the escape of air therethrough is prevented. If, for any reason, this measured charge of liquid in the cylinder 11 is to be returned to the bottle, the measuring tube is returned to normal position; by squeezing on the bulb with the thumb and a finger at the sides of the bulb, the slit 9 is opened to permit equalization of air pressure within the bulb and bottle, and the liquid in the cylinder 11 returns through the port and the measuring tube 21, thence through tube 18 to the bottle.

After the predetermined quantity or bulk has been lifted to the discharge chamber 11, it may be dispensed through a discharge port 27 in the head 5. This port, as seen in Fig. 5, is arranged vertically in the head and communicates with a horizontally disposed discharge spout 28. The passage of liquid through this port, however, is controlled by a rotary plug valve 29 disposed in horizontal position in the head, and provided with a transversely arranged port 30 which is held in normally closed position as in Fig. 5. The stem 31 of this rotary plug valve is provided with a handle 32 which may be turned either to the right or left to cause the port 30 to register with the port 27 to permit discharge of the liquid from the cylinder 11. A spring 33 is interposed between the valve plug 29 and a bracket 34 to hold the valve in operative position, and to compensate for, or take up wear of the valve due to its frictional contact with the head as it is being operated. A nut 35 on the spout 28 is used to clamp the bracket 34 to the head.

After the predetermined quantity or bulk of liquid has been lifted to the cylinder 11 and pressure released from the bulb 8, the liquid in the cylinder may be dispensed therefrom by turning the valve to open position. The bulb must of course be manipulated in such manner as to hold the slot 9 closed when the liquid is being raised, and therefore the bulb is set with the slot 9 in horizontal position as indicated in Fig. 3. For lifting the liquid, the pressure on the resilient or elastic bulb is against its top and bottom walls, and for venting the device, pressure on the side walls of the bulb will open the slot and permit passage of air or circulation of air through the bulb and air chamber 7.

While I have illustrated one complete exemplification of my invention, it will be understood that changes and alterations may be made therein within the scope of my claims without departing from the principles of my invention.

Having thus fully described my invention, what I claim as new and desire to secure by Letters Patent is—

1. In a dispensing device of the bulb type, the combination with a receptacle and means for securing the device in operative relation thereto, means for elevating an excess quantity of liquid from the receptacle, a discharge chamber for receiving the liquid, means for predetermining the bulk discharged into said chamber, means for dispensing the predetermined bulk from said chamber and means for permitting return flow of the excess liquid to the receptacle.

2. In a dispensing device of the bulb type the combination with a head and discharge chamber, of a supply pipe having one end fixed in said head, a telescopic measuring tube in said pipe and movable into the chamber, and a stem for adjusting said measuring tube.

3. The combination in a dispensing device of the bulb type with a head and a discharge chamber, of an extension sleeve depending from the head and communicating with an air chamber in the head, a supply pipe passing through said sleeve and secured in the head, a telescopic measuring tube in said pipe and head and means for adjusting said tube, and valve controlled means for dispensing liquid from the discharge chamber.

4. In a dispensing device of the bulb type the combination with a head, a discharge chamber carried thereby and having a scale on its walls, a supply pipe in said head, a measuring tube telescoping in said pipe and provided with a mark adapted to coincide with a mark on the scale, and means for adjusting said measuring tube.

5. In a liquid dispensing device of the pneumatic type the combination with a bottle, a stopper for supporting the device in said bottle and a head supported on the stopper, of a vessel having a discharge chamber and supported in the head, a variable measuring device for predeterming the bulk of liquid, a regulating device to stop or hold the variable measuring device at any position desired, and valve controlled means for dispensing the predetermined bulk.

6. In a liquid dispensing device of the bulb type the combination with a bottle, a stopper for supporting the device in said bottle and a head supported on the stopper, of a vessel having a discharge chamber and supported in the head, a measuring device for predetermining the bulk of liquid, a stopping or holding device coacting in conjunction with, said measuring device, and valve controlled means for dispensing the predetermined bulk.

7. In a liquid dispensing device of the pneumatic type the combination with a bottle, a stopper for supporting the device in said bottle and a head supported on the stopper, of a vessel having a discharge chamber and supported in the head, a variable measuring device for predetermining the bulk of liquid, a regulating device to stop or hold the variable measuring device in any given position, and valve controlled means for dispensing the predetermined bulk.

JOHN H. DAVIS.